United States Patent [19]

Kopp

[11] 4,105,255
[45] * Aug. 8, 1978

[54] CAST ONE-PIECE ANNULAR RIM MEMBER FOR A VEHICLE WHEEL

[75] Inventor: Hans Kopp, Schaffhausen, Switzerland

[73] Assignee: Georg Fischer Aktiengesellschaft, Schaffhausen, Switzerland

[*] Notice: The portion of the term of this patent subsequent to Jun. 22, 1992, has been disclaimed.

[21] Appl. No.: 669,489

[22] Filed: Mar. 23, 1976

Related U.S. Application Data

[62] Division of Ser. No. 514,912, Oct. 15, 1974, Pat. No. 3,964,144.

[30] Foreign Application Priority Data

Oct. 16, 1973 [CH] Switzerland .................. 14612/73

[51] Int. Cl.² .................................. B60B 21/02
[52] U.S. Cl. ........................................ 301/97; 301/65
[58] Field of Search ................... 301/65, 97; 29/159.1; 164/55; 249/56

[56] References Cited

U.S. PATENT DOCUMENTS

| | | | |
|---|---|---|---|
| 1,635,490 | 7/1927 | Meldrum | 301/65 |
| 1,947,911 | 2/1934 | Kay | 301/65 |
| 2,323,972 | 7/1943 | Brauchler | 29/DIG. 18 |
| 3,253,862 | 5/1966 | Watanabe et al. | 301/65 |
| 3,263,315 | 8/1966 | O'Brien | 29/159.1 X |
| 3,674,315 | 7/1972 | Lejeune | 301/65 |
| 3,819,365 | 6/1974 | McCaulay et al. | 164/55 X |
| 3,965,962 | 6/1976 | Tanaka et al. | 164/55 |

FOREIGN PATENT DOCUMENTS 383,605 2/1931 United Kingdom ................ 301/65

*Primary Examiner*—Robert B. Reeves
*Assistant Examiner*—Charles A. Marmor
*Attorney, Agent, or Firm*—Toren, McGeady and Stanger

[57] ABSTRACT

In casting an annular rim member for use in a vehicle wheel for mounting a pneumatic tire, a mold cavity is formed so that the casting has at least one of a radial overdimension or a radial underdimension and its outer surface which faces the tire has an unsegmented annular area. After the casting is solidified and removed from the mold, it is plastically deformed by radially directed cold forming or working to remove the radial overdimension or underdimension. A modular cast iron is used for the casting to provide a ductile structure whose yield point is exceeded in carrying out the plastic deformation.

6 Claims, 11 Drawing Figures

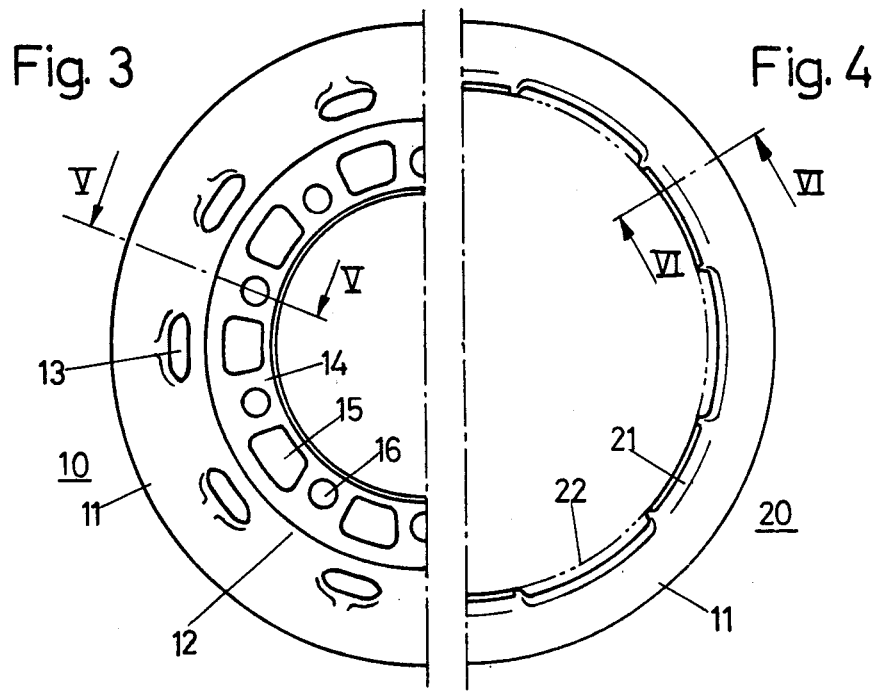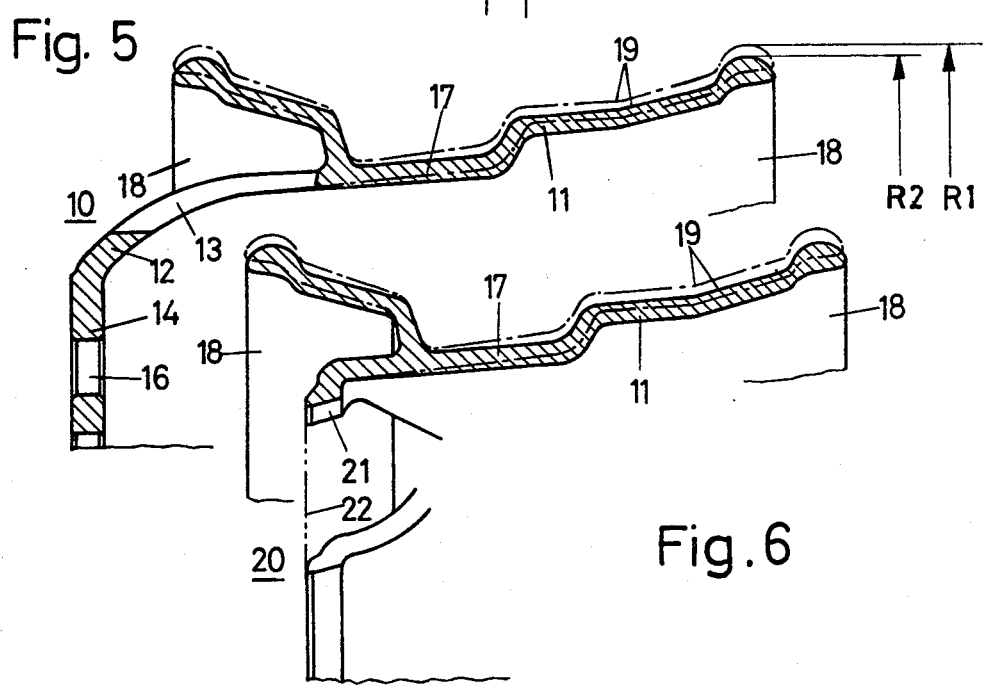

CAST ONE-PIECE ANNULAR RIM MEMBER FOR A VEHICLE WHEEL

This is a divison of application Ser. No. 514,912 filed Oct. 15, 1974, now U.S. Pat. No. 3,964,144.

SUMMARY OF THE INVENTION

The invention relates to the formation of a cast one-piece annular rim member for a vehicle wheel used for mounting a pneumatic tire, in particular a tubeless tire, and more particularly, it concerns the casting of the rim member from iron-carbon melt within a mold so that following the casting the rim member has at least one of a radial overdimension or underdimension which is subsequently removed by plastic deformation.

At the present time, rims for passenger and motor vehicle wheels equipped with pneumatic tires are generally formed of sheet iron. A rolled sheet strip of suitable dimensions is bent into a ring and welded together at its end. After the welding seam is smoothened, the rim section is continuously rolled in several stages until it reaches its final shape by means of a plurality of compression cycles effected in the radial direction as well as in the axial direction. The working performed in the radial direction can be either by expanding or upsetting. Next the rim section is joined, generally by welding, with a wheel lip to form a disk or center-web wheel or, in the alternative, the rim is provided with a support ring for its assembly upon a spoke element or wheelspider.

The manufacturing procedure described above in a greatly simplified form involves a large number of individual operations. It requires appropriately specialized complex manufacturing facilities which require heavy investment, expensive maintenance and continuous supervision. Shaping by means of rolls and rollers provides a relatively narrow latitude with regard to the profile of the rim and it is difficult to meet the tolerances required for the diameter dimensions, concentricity and the like. The welding operations result in local structural changes and in a weakening of the material, and internal stresses developed cause distortions of the workpiece. Finally, sheet metal rims are also relatively corrosion-prone.

It has also been proposed to cast rims with a wheel dish or a support ring so that the rim member is shaped directly as a casting in a process using light metals, cast iron, or steel. When rims are cast in this manner it is necessary, with regard to the surface property, projecting casting burrs, and dimensional deviations of the raw casting, to machine the outwardly facing surface of the rim to provide a satisfactory seating for the tire. Extensive and accurate machining of the rim involves considerable costs and presupposes corresponding processing allowances with regard to the rim. It is particularly disadvantageous that, as a result of out-of-round or eccentricity frequently present in the casting, the material is removed unevenly during machining, producing a non-uniform wall thickness over the circumference of the rim. As a result, substantial imbalances as well as differential deflections under load develop in the rim. These characteristics have seriously impeded the extensive use of casting in the manufacture of wheel rims.

It is a primary object of the present invention to obviate the problems experienced in the past and to provide an economical process for the manufacture of high quality cast annular rims and annular components for segmented annular rims.

Therefore, in accordance with the present invention, the rim or rim component is provided at least along a portion of the rim cross-section, with a radial overdimension and/or underdimension and its outer surface which faces the tire is molded as an unsegmented annular surface. Further, an ironcarbon melt is used in casting the rim member so that it has a ductile character. After the casting has solidified, it is radially plastically deformed by cold forming or working to provide the rim member with its finished dimensions. There are two preferred variations in the materials used for casting the rim member, one utilizes a cast iron melt pretreated for nodular or spheroidal graphite precipitation and the other uses a cast steel melt which, following the standard heat treatment of the casting, results in a ductile structure suitable for subsequent plastic working.

It should be emphasized, in the present invention, that the term "radial overdimension" does not indicate the customary excess dimension provided for shrinkage upon the solidification of a casting nor is it a processing allowance as required under other circumstances, rather the diameter of the raw casting is enlarged to such an extent that, upon upsetting to the finished dimension, the yield point and the compressive yield point of the material are exceeded. Similarly, the term "radial underdimension" indicates a diameter of the casting in which, upon being expanded to the finished dimension, the yield point of the material is exceeded.

In addition, the invention relates to an annular rim or an annular rim component formed in accordance with the abovementioned process, which is characterized by the fact that its outer surface arranged to face the tire, is constituted by an intact skin.

The process of the present invention for forming an annular rim member affords a very economical process making use of all the advantages of casting, such as greater freedom in shaping, permitting even deviations from a true rotary body, one-piece manufacture of the rim and wheel lip or supporting ring or supporting lugs in the same operating cycle, the manufacture of different types of workpieces in the same facility, simple conversion of models and the like. Compared to the casting processes used in the past, the costly and time-consuming machining of the outer surface of the casting can be eliminated which is achieved on one hand by forming an unsegmented annular area on the outer surface of the casting which does not result in any burrs or ribs and, on the other hand, by bringing the wheel member to the finished dimensions by plastic deformation through cold working or forming. The radial upsetting and/or expanding of the rim member results in reinforcing the ductile casting material and in the creation of inherent compressive or tensile stresses acting as desirable prestresses with respect to the load to be carried by the wheel. The rims formed in accordance with the present invention are characterized by a narrow, circumferentially uniform wall thickness. Owing to the intact condition of the skin, the rim members are more resistant to corrosion than sheet metal or cast and machined rims.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing

FIG. 3 is a half-view of a disk or center-web wheel cast in the mold shown in FIG. 2;

FIG. 4 is a half-view, similar to FIG. 3, however showing a cast rim provided with a supporting ring or support lugs;

FIG. 5 is a cross-sectional view taken along line V—V in FIG. 3;

FIG. 6 is a cross-sectional view taken along line VI—VI of FIG. 4;

DETAILED DESCRIPTION OF THE INVENTION

Figure 1:
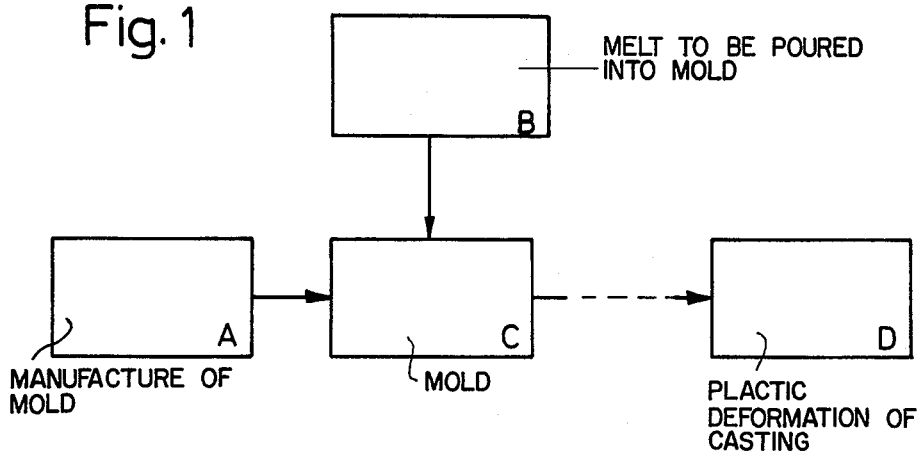
FIG. 1 is a block diagram showing the steps involved in the formation of a rim member in accordance with the present invention.

Prior to a detailed discussion of the various phases of the process embodying the present invention, FIG. 1 diagrammatically illustrates the essential interrelated phases A to D of one embodiment of the process. In the embodiment illustrated in FIG. 1 a cast iron melt is used which has been pretreated for spheroidal or nodular graphite precipitation.

Figure 2:
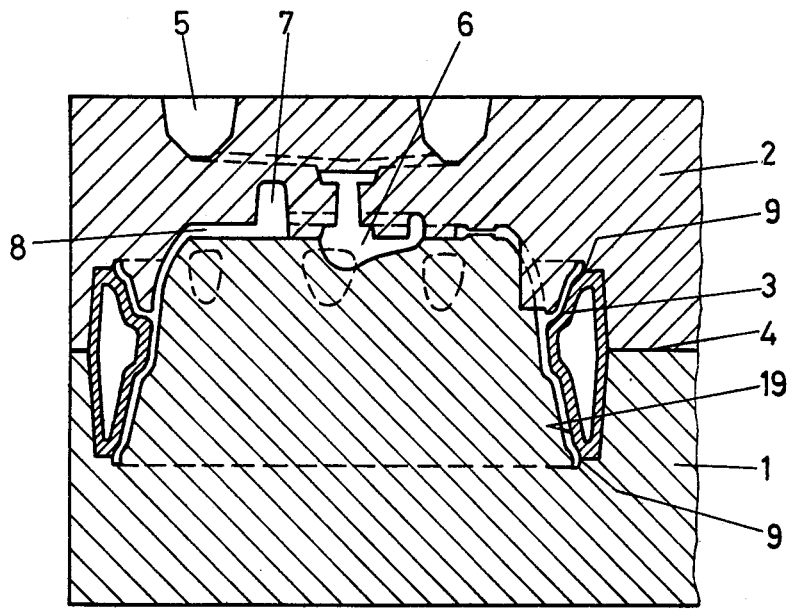
FIG. 2 is a vertical sectional view taken along the axis of a rim member showing a mold for forming the rim member and a wheel lip.
Figure 10:
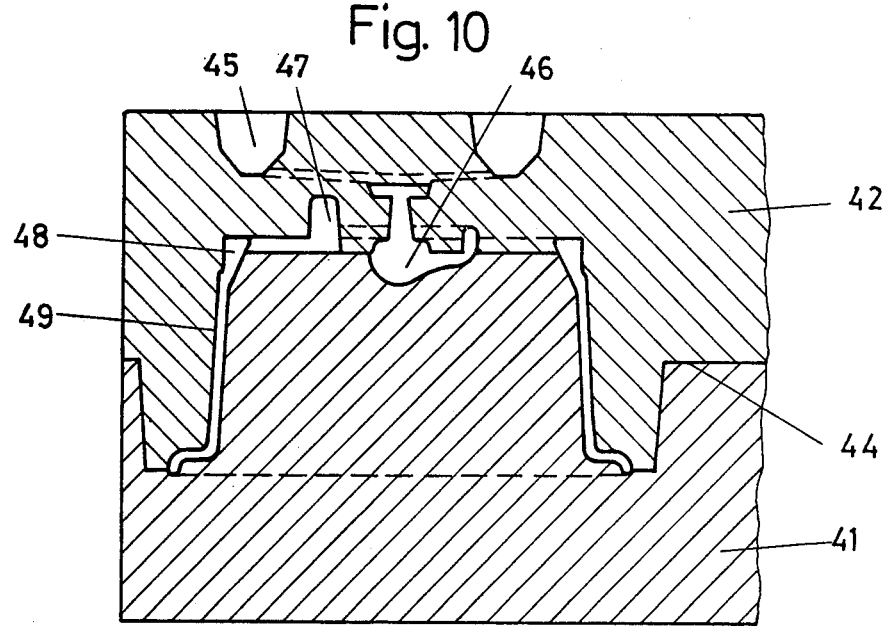
FIG. 10 is a vertical sectional view through a mold similar to that shown in FIG. 2, however, indicating the formation of an annular rim member segmented transversely of its central axis and with the rim including a supporting ring.

In FIG. 1 the block A refers to the manufacture of the mold. Preferably, a standard, one-time mold is used, for instance a sand mold with or without a molding box, two examples of which are illustrated in FIGS. 2 and 10. The cast iron melt charged into the mold is suitably pretreated, as indicated by block B, in accordance with a known process, for instance, magnesium treatment, so that following pouring of the mold, block C, and upon solidification, the carbon will precipitate predominantly as spheroidal graphite and a ductile casting will be formed.

Following the solidification of the casting, various operations take place which have not been illustrated in any detail, such as removal from the mold, deflashing, separation from the casting system, and deburring. In the final block D, the cast rim member is plastically deformed by cold working or forming and during this operation the rim member cast with a radial overdimension and/or a radial underdimension is brought to its finished dimension by radially upsetting or expanding, as required. This part of the formation of the rim member is described in greater detail with regard to FIGS. 7 - 9 and also with respect to FIGS. 5, 6 and 11. The portion of the operation characterized by block D essentially completes the shaping of the rim or rim component, all that remains is the machining of the assembly flange on the wheel lip and the drilling of assembly holes, and to complete the machining of the supporting lugs or of the support.

One variation of the process as described by FIG. 1 is the selection of the material used as a cast steel melt in place of a cast iron melt. Such a variation eliminates the pretreatment of the melt, block B, however, it is as a rule necessary to subject the solidified steel castings to a known heat treatment for converting the solidification pattern of the casting into a fine-grain secondary structure provided with the ductility required for subsequent cold working. However, a process using such a variation on the materials employed is identical with regard to phases A, C and D.

The important considerations regarding the manufacture of the mold are discussed below with reference to FIG. 2. In FIG. 2 a sand mold is shown in cross-section and consists of a lower mold section 1, an upper mold section 2, and a preferably hollow annular core 3 bridging the location of the mold partition 4 between the two mold sections. As a result, the inner surface of the core 3 defines the radially outer surface 19 of the casting. The upper mold section 2 includes an upper duct 5 leading to a casting system 6. Within the mold, recesses form a mold cavity 8 to which feeder ducts 7 are connected. The mold in FIG. 2 forms a disk or center-web wheel as illustrated in FIGS. 3 and 5 and includes an annular one-piece flat-shouldered drop-center rim 11 and a wheel lip or dish 12. The wheel lip 12 has openings 13 and recesses 15 are formed in the flange 14 adjoining the wheel lip, both the openings 13 and the recesses 15 are formed during the molding operation, however, the bore holes 16 provided in the flange for assembly purposes, are drilled in the casting preferably subsequent to the operating cycle described above. In FIGS. 4 and 6, a rim 20 is formed having a rim portion identical with that shown in FIGS. 3 and 5. However, the rim 20 is assembled on a spoke element or wheelspider and, for this purpose, is provided with a plurality of supporting lugs 21. In place of the supporting lugs, a known continuous support ring 22 can be provided as indicated by the dash-dot line in FIGS. 4 and 6. It is essential in molding the rims or rim portions, in accordance with the present invention, that the outer surface 19 of the rim, note FIGS. 2, 5 and 6, which faces the tire is formed as an unsegmented annular area to prevent any shifting or the formation of any transverse burrs. In the mold shown in FIG. 2, the unsegmented annular area is provided by the one-piece, closed annular core 3. In the mold, shown in FIG. 2, at most peripherally-oriented burrs are located at the rim edges outside the tire seating area, that is, the location 9 in FIG. 2, and such burrs can be easily removed, such as by trimming.

Moreover, with respect to the subsequent plastic deformation of the rim, it is provided with a radial overdimension exceeding that customarily provided for shrinkage which occurs during solidification or for the allowance provided for processing purposes which would not be required in the present instance. To illustrate the radial overdimension, the rim contour of the solidified casting is shown in FIGS. 5 and 6 as a dash-and-dot line and the contour of the finished, radially upset and plastically deformed rim is shown in full lines. The radii at the rim edges 18 are shown by R1 in the as cast state of the rim and by R2 after the finishing operation has been completed on the rim. The overdimension at the rim edge 18 and the subsequent reduction under plastic deformation can be advantageously selected to be greater than the overdimension at the rim base where the rim proceeds to form the wheel lip 12 or the supporting lugs 21 for support ring 22. The amount of the overdimension is such that, upon cold working of the ductile cast material, the yield point of the material is clearly exceeded. Accordingly, the amount of the overdimension at the rim edge is selected in the range between 1 and 10%, preferable approximately 1.5 to 2%, of the diametral dimensions. Measurements performed on a 22.5 inch drop-center, (rated diameter 571.5mm), in accordance with FIGS. 5 or 6, and made of nodular or spheroidal graphite cast iron grade GGG-42 show the diameter difference to constitute 10mm at the edge of the rim and 6mm at the base of the rim. Similar values are applicable when cast steel is used in forming the rim.

A material which is highly suitable for the above process is cast iron with nodular graphite. Preferably, a cast iron melt can be pretreated by means of metallic magnesium in a process described in the publication "Giesserei" (59), vol. 1 dated Jan. 13, 1972, pages 1–12. A melt pretreated in this manner and containing, for instance, 3.6 – 3.8% C and about 2.4% Si, after pretreatment will yield a ductile, ferritic structure accompanied by predominantly nodular cast iron precipitation.

The material data corresponds to class GGG-42 according to DIN (German Industrial Standards) 1693 (tensile strength minimum 42 kilopond/sq.mm, yield point minimum 28 kilopond/sq.mm., elongation minimum 12%, Grinell hardness 140–190).

A suitable cast steel for use in the process is GS-45.3 according to DIN, that is, a steel melt containing approximately 0.21% C, 017% Mn, and 0.4% Si which produces, following standard heat treatment (annealing at 900° – 1000° C), a casting having a ductile structure and the following minimum characteristics: tensile strength 45 kiloponds/sq.mm., yield point point 23 kiloponds/sq.mm, elongation 22%, Brinell hardness 125–165. Such castings, having wall thicknesses of about 7–8mm in the area of the rim profile, with respect to the above described example, can in an excellent manner be plastically deformed by cold working as required.

Figure 7:
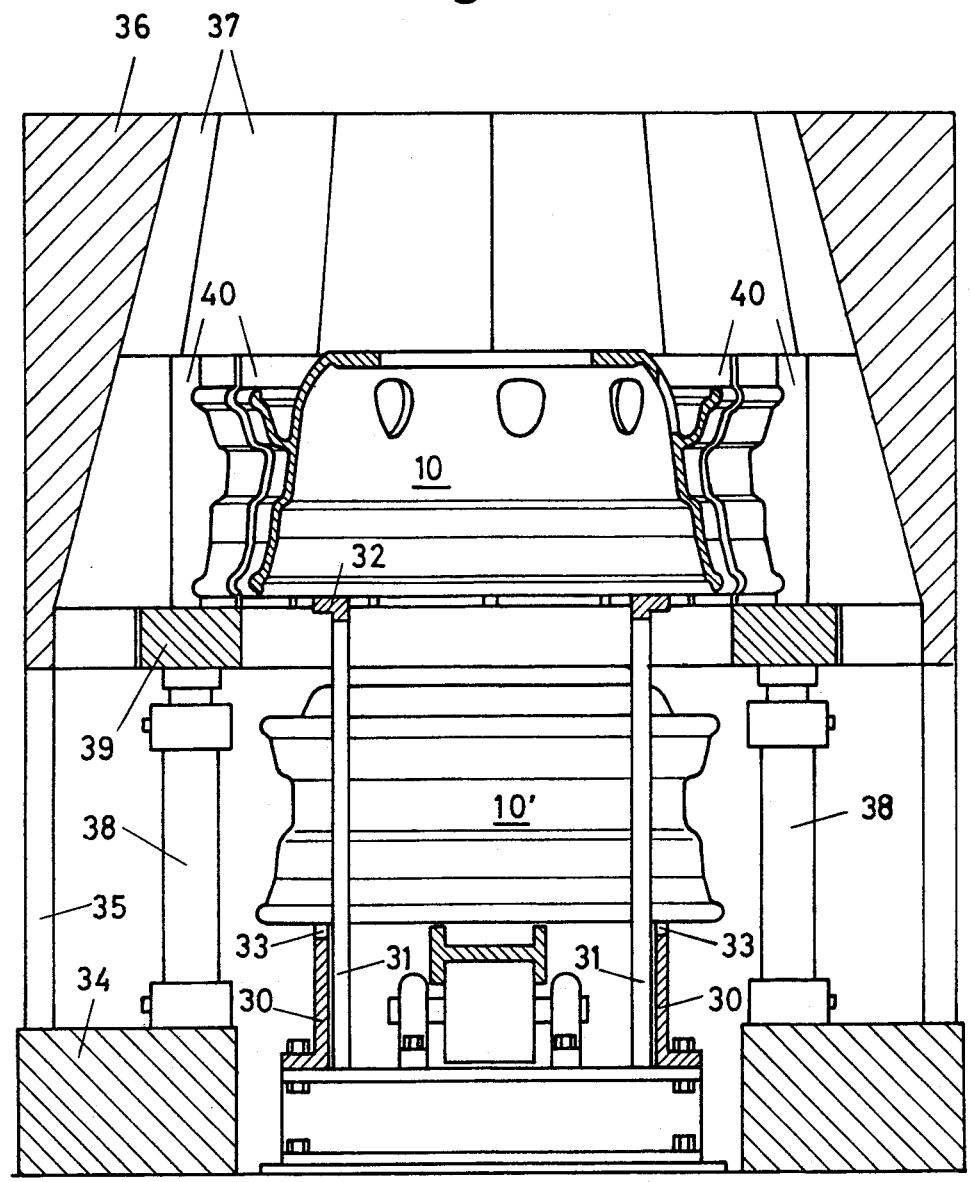
FIGS. 7, 8 and 9 illustrate a device for radially upsetting a cast rim, with each figure illustrating a different phase of the forming operation.
Figure 8:
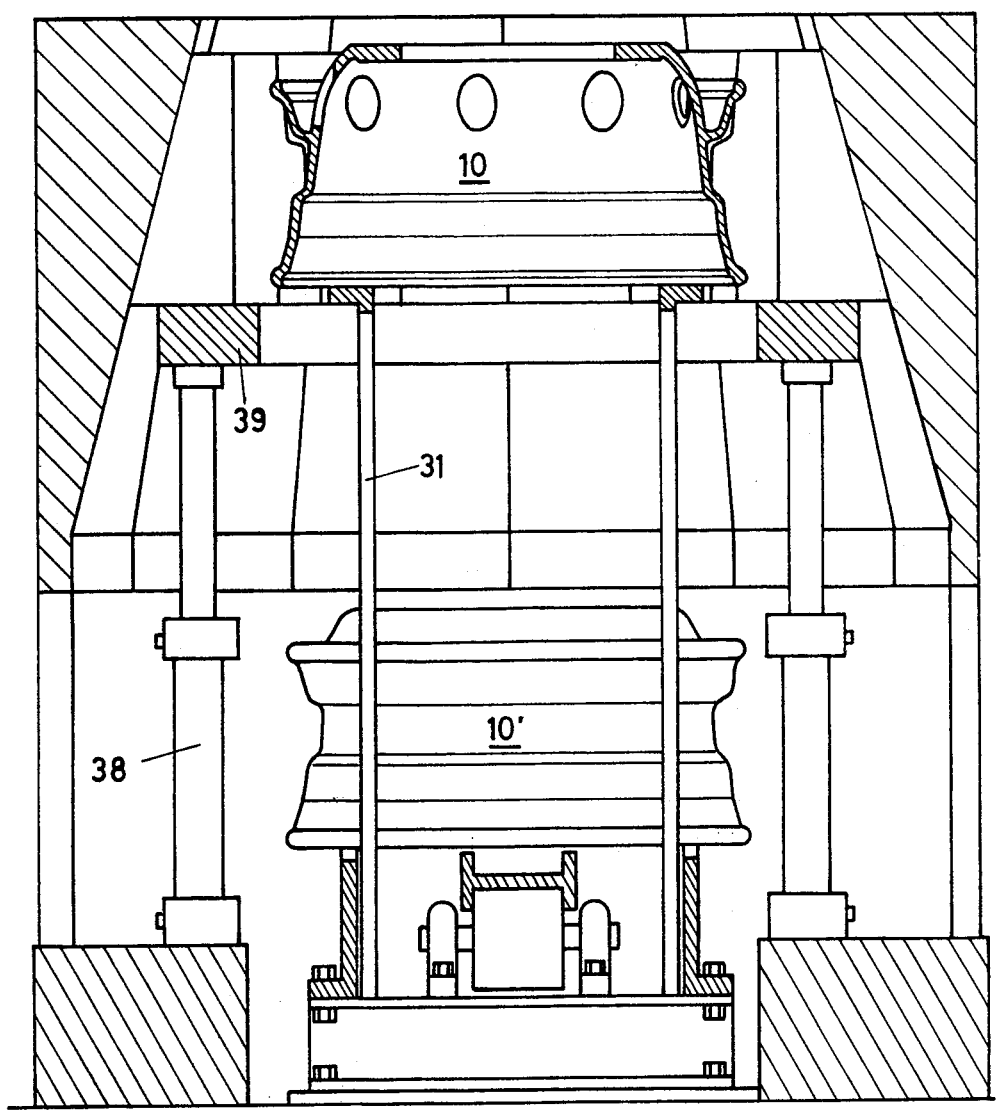
Figure 9:
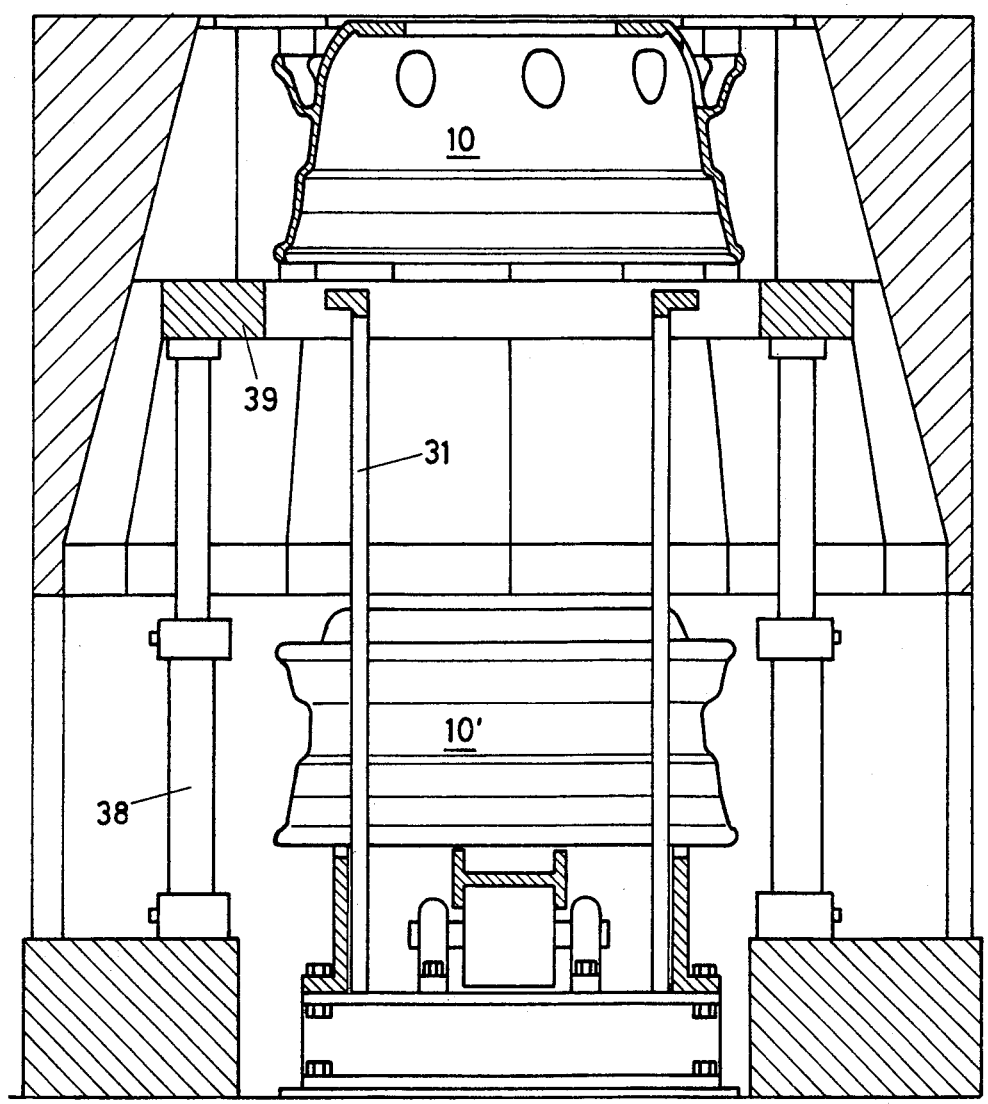

The cold working of the rim members cast in the manner described above is explained below with reference to FIGS. 7–9. In FIGS. 7 – 9 disk or center-web wheels 10 are shown, such as are illustrated in FIGS. 3 and 5, however, it would also be possible to use the rims of FIGS. 4 and 6 in the forming apparatus shown in FIGS. 7 – 9. The wheels 10 are advanced in a step-wise fashion along continuous rails 30 of a processing line for movement into the working device illustrated in FIGS. 7 – 9. In these Figs. a workpiece 10' is shown in position for movement into the working device. Within the forming or working device, lifting rods 31 are positioned between the rails 30 and can be raised and lowered either pneumatically or by other means. At their upper ends, the rods 31 have horizontally arranged crossbars 32 which can be lowered into recesses 33 in the rails so that the upper surfaces of the crossbars are flush with the top of the rails. In the retracted or lowered position of the lifting rods 31, the workpiece 10' can be pushed forwardly onto the crossbars 32. Subsequently, the rim or workpiece 10 can be raised by means of the lifting rods 31 into the position shown in the upper portion of FIG. 7.

The device shown in FIGS. 7–9 is similar to known devices for shaping annular sheet metal components. A solid guide ring 36 is supported on columns 35 from a base 34 and the interior of the ring includes a plurality of plane, sloping guide areas 37, that is the guide areas slope inwardly in the upward direction. Die segments 40 provided with a die surface adapted to the respective workpiece can be moved along the sloping guide areas 37. The die segments 40 are positioned on the ring 39 which rests on the pistons or plungers of a plurality of hydraulic hoisting units 38 extending about the circumference of the ring 39 and supported at their lower ends by the base 34.

In the lower limiting position of the ring 39 and the segments 40, the segments have a maximum radial dimension with respect to the central axis of the device. As indicated above, the rim workpiece 10 is lifted by the lifting rods 31 into the open ring of segments 40. Subsequently, the ring 39 is raised by the hydraulic units 38 and, at the same time, the rim workpiece is lifted by the rods 31. During such upward movement, the segments move along the inwardly sloping guide areas 37 and radially approach the outer surfaces of the rim workpiece 10. FIG. 8 illustrates the lifting positions in which the die segments are flush against the rim edges. Since the radial overdimension of the cast rims is less at the base 17 of the rim than at its edge 18, as explained with regard to the arrangement shown in FIGS. 5 and 6, a certain spacing exists in the position shown in FIG. 8 between the rim base and the corresponding surface of the segments 40 designed to provide the finished rim profile. As the ring 39 and the segments continue to be displaced upwardly they reach the position shown in FIG. 9 and provide a complete closing of the collar of segments with a radial compression or calibrating of the rim to obtain plastic deformation by cold working.

After the rim has achieved its final or finished shape, the ring 39 supporting the segments 40 is lowered, by releasing the lifting apparatus 38, into the position illustrated in FIG. 7 with the collar of the segments opening up. At the same time, the finished rim workpiece 10 is lowered and deposited on the rails 30 by means of the lifting rods 31. The completed workpiece is then moved out of the device and the next workpiece is positioned to commence the shaping cycle.

Figure 11:
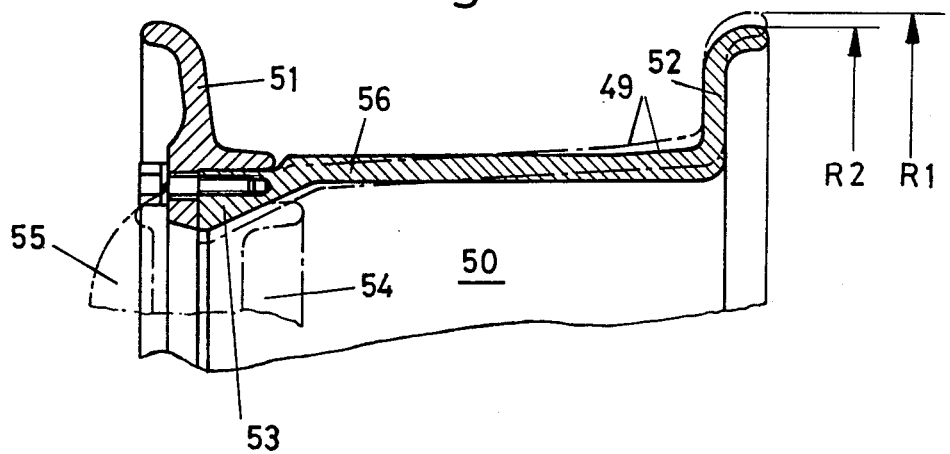
FIG. 11 is a cross-sectional view through an annular rim similar to that shown in FIG. 10.

In FIGS. 10 and 11 another embodiment is shown of a steep-shouldered annular rim segmented in a plane extending transversely through the central axis of the rim. The mold shown in FIG. 10 forms a closed annular rim member 50, note FIG. 11, having one rim lobe 52 and a rotary thrust ring 53 having an inwardly tapering surface, so that following the mounting of the tire, a second annular rim lobe 51 can be secured to the thrust ring by bolts. A rim assembled in this manner is intended to be mounted on a wheelspider 54 by means of clamps 55 both of which are indicated by dot-dash lines in FIG. 11.

FIG. 10 illustrates a vertical section through a casting mold, such as a one-time sand mold, for forming the rim part or member 50 shown in FIG. 11. The mold consists of a lower portion 41 and an upper portion 42 having a parting surface or joint 44 between them. The upper and lower portions 41, 42 of the mold form a mold cavity 48. An upper duct 45 is connected by a casting system 46 to a feeder duct 47 connected to the mold cavity 48 for filling the mold cavity with the melt. Unlike the unsegmented rim disclosed in FIGS. 3–6, the rim part shown in FIG. 11 can be molded without an annular core. The joint area 44 of the mold, as shown in FIG. 10, has been arranged so that the outer surface 49 of the rim part 50 which faces the tire, is molded as an unsegmented annular area.

In FIG. 11 the profile of the casting, as initially formed, is shown in dot-dash lines while the outline of the finished rim part 50 is shown in full line. Further, the portion of the cross-section of the rim part 50 is shown on the righthand part of FIG. 11 and including the rim lobe 52 is formed with a radial overdimension. The extent of this radial overdimension, that is, the differences in the radii R1 – R2 is established by taking into account the ductile casting material used and the other considerations used regarding the previous example. With regard to the die used in providing the finished dimensions of the rim part 50, it may be appropriate to form the portion 56 of the rim part, that is as shown in the lefthand part of FIG. 11, so that it is radially underdimensioned. That portion of the rim part 50 which is radially overdimensioned is cold worked to attain the desired plastic deformation and its final dimensions are achieved by radial upsetting in a device similar to that shown in FIGS. 7 – 9. However, with regard to the radially underdimensioned portion 56, which is not significant as far as the seating of the tire is concerned, it is necessary to expand the rim part to reach the final dimension. This operation can be performed at the same time as the radial upsetting by a known expander device, not shown, of the type manufactured by Grotnes Machine Work, Inc. of Chicago, Ill.

Moreover, in the case of certain rim designs it may be appropriate to cast the entire rim so that it is radially underdimensioned and to expand it to the desired final dimensions. The above-mentioned expander device would be suitable for this purpose.

The ductile casting materials used for the previously described embodiments are also appropriate for the annular rim part 50 of FIG. 11 and, therefore, have not been repeated.

While specific embodiments of the invention have been shown and described in detail to illustrate the application of the inventive principles, it will be understood that the invention may be embodied otherwise without departing from such principles.

What is claimed is:

1. An annular rim member for use in a vehicle wheel equipped with a pneumatic tire and, in particular, a tubeless tire, said annular rim being formed by the process comprising the steps of forming a mold cavity for the rim member with at least one of a radial over dimension and a radial under dimension of an amount other than the customary excess dimension provided for shrinkage or as a processing allowance, at least over an annular portion of the rim cross-section and with the outer surface of the rim member arranged to face the tire having a unitary annular area, pouring nodular cast iron melt into the mold cavity for forming the rim member with a ductile structure, removing the cast rim member from the mold cavity and radially plastic cold working the solidified cast rim member for plastically deforming the rim member during which plastic deformation the yield point of the cast ductile structure is exceeded and attains the established radial dimensions of the rim member for removing the at least one of a radial over dimension and a radial under dimension.

2. An annular rim member, as set forth in claim 1, including the step of forming the surface of the mold cavity which defines the outer area of the rim member facing the tire with a unitary closed annular core.

3. An annular rim member, as set forth in claim 1, including the step of forming the cast rim member with at least one of a radial over dimension and a radial under dimension which is greater at the edges of the rim member than at the base of the rim member spaced inwardly from the rim edge.

4. An annular rim member, as set forth in claim 1, including the step of limiting the radial over dimension and/or under dimension of the cast rim member to the range of one to ten percent of the diameter dimensions of the rim member.

5. An annular rim member, as set forth in claim 4, comprising limiting the radial over dimension and/or radial under dimension of the cast rim member to the range of 1.5 to 2% of the diameter dimensions of the rim member.

6. An annular rim member, as set forth in claim 1, wherein an annular portion of the rim is radially over dimensioned and another annular portion of the rim is radially under dimensioned and plastically deforming the ring member by upsetting the radially over dimensioned annular portion and expanding the radially under dimensioned annular portion to achieve the established radial dimensions of the rim member.

* * * * *